(12) United States Patent
Zimbric et al.

(10) Patent No.: US 8,295,766 B2
(45) Date of Patent: Oct. 23, 2012

(54) METHODS AND DEVICES FOR AUTOMATIC MULTIPLE PAIRING OF BLUETOOTH DEVICES

(75) Inventors: Frederick J. Zimbric, Gurnee, IL (US); Michael G. Walsh, Johnsburg, IL (US); Mark Graham Adams, Jr., Hoschton, GA (US)

(73) Assignee: Motorola Mobility LLC, Libertyville, IL (US)

( * ) Notice: Subject to any disclaimer, the term of this patent is extended or adjusted under 35 U.S.C. 154(b) by 391 days.

(21) Appl. No.: 11/848,883

(22) Filed: Aug. 31, 2007

(65) Prior Publication Data

US 2009/0061769 A1    Mar. 5, 2009

(51) Int. Cl.
  *H04B 7/00* (2006.01)
(52) U.S. Cl. .................... 455/41.2; 455/569.1
(58) Field of Classification Search ............... 455/41.2, 455/569.1, 557
  See application file for complete search history.

(56) References Cited

U.S. PATENT DOCUMENTS

| | | | |
|---|---|---|---|
| 7,164,885 B2 * | 1/2007 | Jonsson et al. ............. 455/41.2 |
| 2002/0068610 A1 * | 6/2002 | Anvekar et al. ............. 455/560 |
| 2005/0111036 A1 * | 5/2005 | Takasaki et al. ............ 358/1.15 |
| 2006/0135204 A1 * | 6/2006 | Angelhag .................... 455/557 |
| 2006/0199536 A1 | 9/2006 | Eisenbach |
| 2007/0197164 A1 * | 8/2007 | Sheynman et al. .......... 455/41.2 |
| 2007/0206829 A1 * | 9/2007 | Weinans et al. ............. 381/370 |
| 2007/0259621 A1 * | 11/2007 | Lin et al. ..................... 455/41.2 |
| 2008/0051156 A1 * | 2/2008 | Matsuda ...................... 455/569.2 |
| 2009/0011799 A1 * | 1/2009 | Douthitt et al. ............. 455/569.1 |

OTHER PUBLICATIONS

Patent Cooperation Treaty, International Search Report and Written Opinion of the International Searching Authority for International Application No. PCT/US2008/074142, Jan. 28, 2009, 13 pages.

* cited by examiner

*Primary Examiner* — Temesgh Ghebretinsae
*Assistant Examiner* — Gennadiy Tsvey
(74) *Attorney, Agent, or Firm* — Gary J. Cunningham

(57) ABSTRACT

The described methods and devices provide a more user-friendly solution to the problem of pairing and connecting multiple devices to a Bluetooth accessory. The paired device list of the Bluetooth accessory is check to determine the most recently paired devices having particular Bluetooth profiles, for example, a hands free profile (HFP) or an advanced audio distribution profile (A2DP). The accessory attempts connection with the devices, if found. Otherwise the accessory continues connection attempts with devices on the paired device list, according to the connection recency, until the accessory has two connections with different profiles. If no connections are made, or the paired device list is empty, the device enters discoverable mode. In this manner a more user-friendly solution to the problem of pairing a Bluetooth accessory to multiple Bluetooth devices is provided.

13 Claims, 5 Drawing Sheets

METHODS AND DEVICES FOR AUTOMATIC MULTIPLE PAIRING OF BLUETOOTH DEVICES

FIELD

Disclosed are methods and devices for pairing and connecting a Bluetooth accessory to a Bluetooth-enabled device, and more particularly methods and devices for automatically pairing and connecting a Bluetooth accessory to multiple Bluetooth-enabled devices having different Bluetooth profiles.

BACKGROUND

Wireless devices, such as cellular telephones and MP3 players, are readily available today and widely used. Many such devices support the use of a Bluetooth accessory, such as a headset, car kit, a Bluetooth-enabled adapter for a portable device, a home entertainment device, or a PC, and a Bluetooth-enabled speaker system. Many Bluetooth accessory devices, for example stereo Bluetooth headsets, are capable of connecting to two devices at a time using different Bluetooth profiles.

A Bluetooth profile describes general behaviors through which Bluetooth-enabled devices communicate with other Bluetooth devices. For example, a hands free profile (HFP) describes how a device such as a mobile telephone can be used to place and receive calls for a hands free device. As another example, an Advanced Audio Distribution Profile (A2DP) describes how stereo quality audio can be streamed to an accessory, for example, from a media player.

When a Bluetooth accessory can connect to two devices, for example a cellular telephone and a media player, at the same time using different Bluetooth profiles, a user may be able to listen to music streamed from the media player using A2DP until a telephone call arrives. The accessory can automatically interrupt the play of music, and upon user input, stream speech to and from the cellular telephone using HFP. Upon the user completing the telephone call, the accessory can automatically return to streaming music from the media player using A2DP.

Before a Bluetooth accessory can stream speech, music, or other content to and from a device, it must be paired with the device, exchanging identification and authentication data. The pairing process can be cumbersome if multiple devices must be paired with a single Bluetooth accessory. Thus a more user-friendly solution to the problem of pairing multiple devices to a Bluetooth accessory may be desirable.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
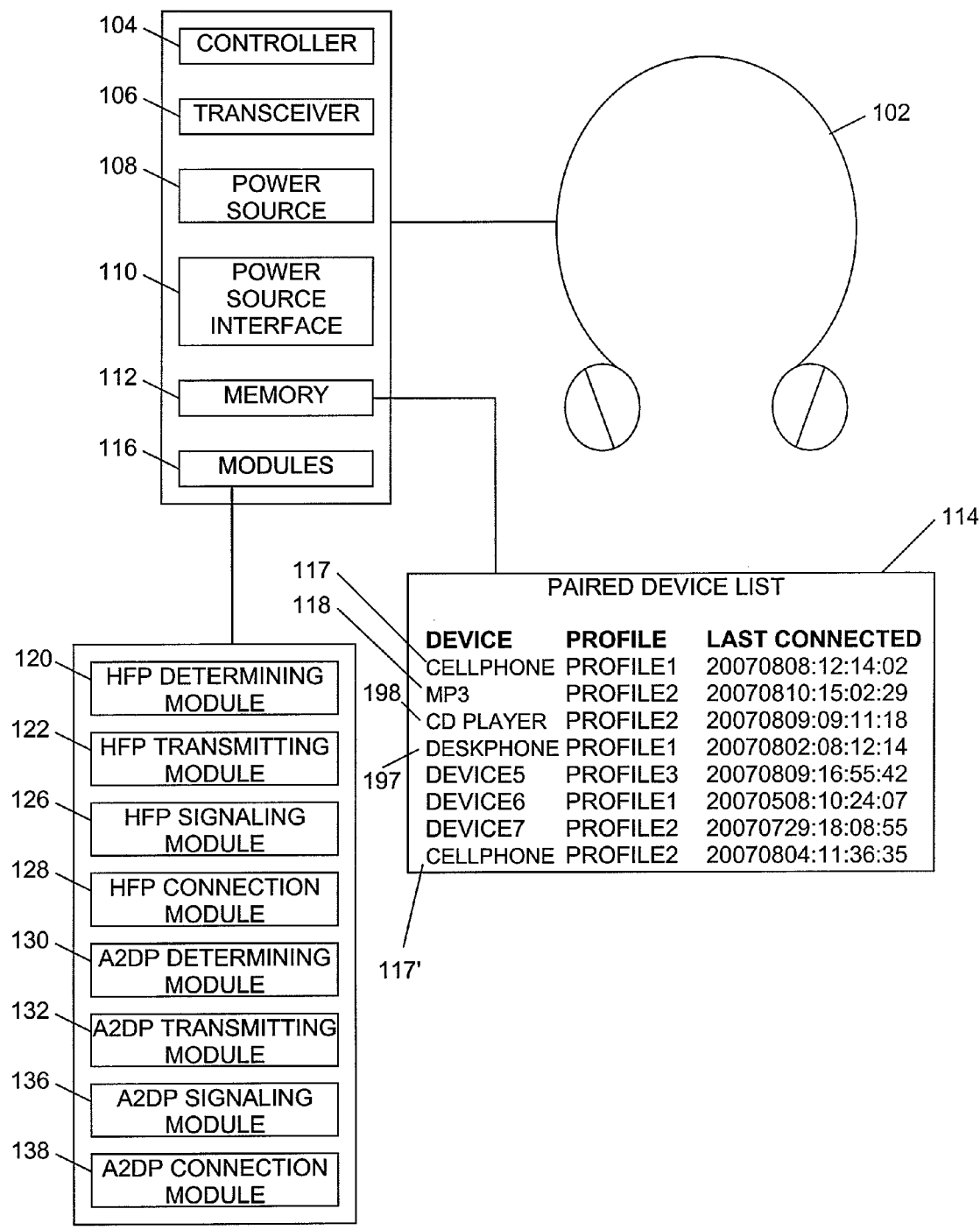
FIG. 1 shows an embodiment of an accessory Bluetooth-enabled device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

It would be beneficial if the process to pair a Bluetooth accessory with multiple devices having different Bluetooth profiles could be automated.

Described are methods and devices to automatically pair an accessory Bluetooth-enabled device with multiple Bluetooth-enabled devices that use different Bluetooth profiles. The multiple Bluetooth-enabled devices can be listed in a paired device list stored in the memory of the accessory Bluetooth device. The paired device list contains identifying information, connection information, and profile type information, for each recently paired device, up to some predetermined number of paired devices. The accessory Bluetooth device determines the most recently paired Bluetooth-enabled device having a first profile. The accessory Bluetooth device searches to find that device, and will attempt to establish a connection between the accessory Bluetooth-enabled device and the most recently connected listed Bluetooth-enabled device of the first profile type, if that device is found. The accessory Bluetooth device also determines the most recently paired Bluetooth-enabled device having a second profile. The accessory Bluetooth device searches to find that device, and will attempt to establish a connection between the accessory Bluetooth-enabled device and the most recently connected listed Bluetooth-enabled device of the second profile type, if that device is found. If no connection can be established, the accessory Bluetooth device enters discoverable mode, that is, it becomes available for discovery by other Bluetooth-enabled devices for subsequent pairing and connection. In discoverable mode a Bluetooth device will listen for inquiries from other Bluetooth devices and will respond to an inquiry. The device's response to the inquiry indicates that it is available for pairing and connection with another Bluetooth device. In this manner a user of an accessory Bluetooth device may automatically pair the accessory with multiple Bluetooth-enabled devices having different Bluetooth profiles without having to execute a cumbersome manual pairing procedure.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited.

Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 shows an embodiment of an accessory Bluetooth-enabled device 102. The device 102 is capable of communication with another Bluetooth-enabled device for transmission and/or reception of for example, speech, music, or other data and as will be described below, is configured to automatically process its paired device list (PDL) of previously paired devices to determine if a plurality of such devices are co-located at power up. Although shown as a headset, the device 102 may be for example, a Bluetooth-enabled car kit, or a Bluetooth-enabled adapter for portable devices such as personal music players, home entertainment devices such as a home stereo system, or personal computers (PCs). A PC adapter may connect to a personal computer to enable Bluetooth communication by the computer. A PC adapter can include for example, a PC USB Bluetooth adapter, or a Bluetooth "smart card" or other Bluetooth enabling device configured to be inserted into a particular port on the computer. It is understood that the device 102 may also represent any Bluetooth-enabled device such as a speaker system that could be used for a computer, a phone, or other portable music player, as well as for home use.

The described Bluetooth-enabled device 102 that is configured to be automatically paired with multiple Bluetooth devices includes a controller 104 that is configured to execute instructions. The controller 104 is also coupled to a Bluetooth transceiver 106 that is configured to transmit and receive signals from another Bluetooth-enabled device, and coupled to a power source 108. When the device 102 is powered up, it may execute the described automatic pairing method so that it processes certain entries of the PDL contained in memory of the accessory device 102, as described below. If at power up, the PDL of the accessory is empty, the accessory enters discoverable mode, and remains discoverable until paired with another device or powered off. The device 102 in addition includes a power source interface 110 that is coupled to the controller and configured to activate the power source 108 to provide power for operation of the device 102. The power source 108 may be, for example, a battery, a solar cell, a fuel cell, or another power source.

The memory 112 is configured to store data including a PDL 114 that may include names, profile types, and other data relating to Bluetooth-enabled devices recently connected to the device 102. The PDL 114 may list a plurality of paired devices. For example, the PDL 114 may list a cell phone 117, an MP3 player 118, a CD player, a desk phone, and additional devices, each type of device having a particular profile.

The PDL lists a profile type for each device. For example, the cell phone 117 and the desk phone 197 may connect to the accessory Bluetooth device 102, in this discussion a headset, according to a first profile, designated as PROFILE1 in the PDL 114. The first profile may be, for instance, a hands free profile (HFP). The MP3 player 118 and the CD player 198 may connect to the accessory device 102 according to a second profile, designated as PROFILE2 in the PDL 114. The second profile may be for instance an advanced audio distribution profile (A2DP). Other devices listed in the PDL may connect according to the first profile PROFILE1 such as a desk phone, the second profile PROFILE2 such as a CD player, or another profile, for example, PROFILE3. HFP and A2DP are discussed further below.

The PDL may in addition list a time of last connection for each listed device. In this example, the most recently connected PROFILE1 device is first processed by the described device, such being the cell phone 117, last connected at 12:14:02 on Aug. 8, 2007. The second most recently connected PROFILE1 device is the desk phone 197, last connected at 8:12:14 on Aug. 2, 2007. In the PDL 114, the most recently connected PROFILE2 device is the second processed by the described device, such being the MP3 player 118, last connected at 15:02:29 on August 10, and the second most recently connected PROFILE2 device is the CD player 198, last connected at 9:11:18 on August 9. It is understood that devices listed in the PDL 114 may be grouped in the PDL according to profile, and may be listed in the PDL in an order corresponding to each listed device's recency of connection.

The PDL 114 also shows that the cell phone 117' had been connected to the accessory 102 according to PROFILE2, most recently at 11:36:35 on August 4. As shown by this example, a single device, for example a cell phone which may in addition have audio playback capability, may connect to the accessory Bluetooth device 102 according to more than one profile. Below is a discussion of the order in which a stand-alone music player and a music player integrated into a cell phone are processed.

Bluetooth devices connect with one another according to predetermined profiles. As mentioned earlier, a hands free profile (HFP) describes how a device such as a mobile telephone can be used to place and receive calls for a hands free device such as for example a headset or car kit, that is, the hands free device can access some of the functionality of the mobile telephone through a Bluetooth connection according to HFP. With HFP, hands free Bluetooth devices, such as car kits, can allow users with Bluetooth-equipped cell phones the use of some features of the phone features to make calls. The cell phone itself can be left in a pocket, briefcase, or valise, or even in the trunk of a car.

An Advanced Audio Distribution Profile (A2DP) describes how stereo quality audio can be streamed to an accessory, for example, from a media player. A2DP may support particular coding and decoding schemes such as, for example several versions of MPEG coding schemes.

A Bluetooth-enabled device may support other profiles. A headset profile (HSP) describes how a Bluetooth enabled headset can communicate via Bluetooth with a computer or other device such as a mobile communication device, so as to act as the computer or mobile communication device's audio input and output interface. Additional profiles include a fax profile (FAX) that describes how for example a Bluetooth enabled mobile communication device can interface with for example a personal computer with an installed software FAX capability, and a file transfer profile (FTP) that describes how for example a Bluetooth enabled mobile communication device may browse files and folders on a server. A single Bluetooth device may be configured to support multiple profiles, and may connect via multiple profiles simultaneously. For example, a mobile communication device may support both HFP and A2DP, as previously mentioned. An accessory Bluetooth device may likewise support both HFP and A2DP.

When a Bluetooth device supports multiple profiles that are also supported by the accessory Bluetooth device 102, the described device manages the issue of profile priority in automatically pairing with certain co-located devices at power up. In the described embodiment the accessory Bluetooth device will attempt to establish a connection with the Bluetooth device according to a profile with priority over another profile. The accessory may be configured to first search for and attempt connection with the mobile communication device according to HFP since connecting with a mobile device would be a first priority. The accessory device may be configured to second search for and attempt connection with a stand-alone A2DP device, such as, for example, a Bluetooth-enabled MP3 player having a second priority. If no connection can be made with a stand-alone A2DP device, the accessory may be configured to third search for and attempt connection with the mobile communication if it supports A2DP. For example, a mobile communication device, as mentioned, may support both HFP and A2DP, as may be the case for a cellular telephone that also includes an MP3 player. In this manner, an MP3 player which may have a larger selection of music and more music functionality than that of a mobile communication device may have priority for automatic connection with the accessory device if the MP3 player is available for connection. However, the described method can automatically connect with the mobile communication device under both HFP and A2DP if for example the MP3 player is unavailable for connection by powering the MP3 player down, moving it out of range of the accessory device, or in some other manner making it unavailable for connection with the accessory device.

A memory 112 of the device 102, in this example a headset, may be configured to store instructions and modules 116 for execution by the controller 104. The modules 116 include a hands free profile (HFP) determining module 120 configured to determine a last-connected HFP device. The modules 116 in addition include an HFP transmitting module 122 configured to generate a command to search to find the last-connected HFP device. The modules 116 may also include an HFP signaling module 126 configured to attempt to establish an HFP connection, and an HFP connection module 128 configured to establish a connection between the Bluetooth accessory device and an HFP device.

The modules 116 include analogous determining, transmitting, signaling, and connection modules for advanced audio distribution profile (A2DP) devices. For example, the modules include an A2DP determining module 130 that is configured to determine a last-connected A2DP device, and an A2DP transmitting module 132 that is configured to generate a command to search for the last-connected A2DP device. The modules 116 may include an A2DP signaling module 136 configured to attempt to establish an A2DP connection, and an A2DP connection module 138 configured to establish a connection between the Bluetooth accessory device and an A2DP device. It is understood that the modules 116 may include corresponding determining, transmitting, signaling, and connection modules for other profiles as well.

The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Figure 2:
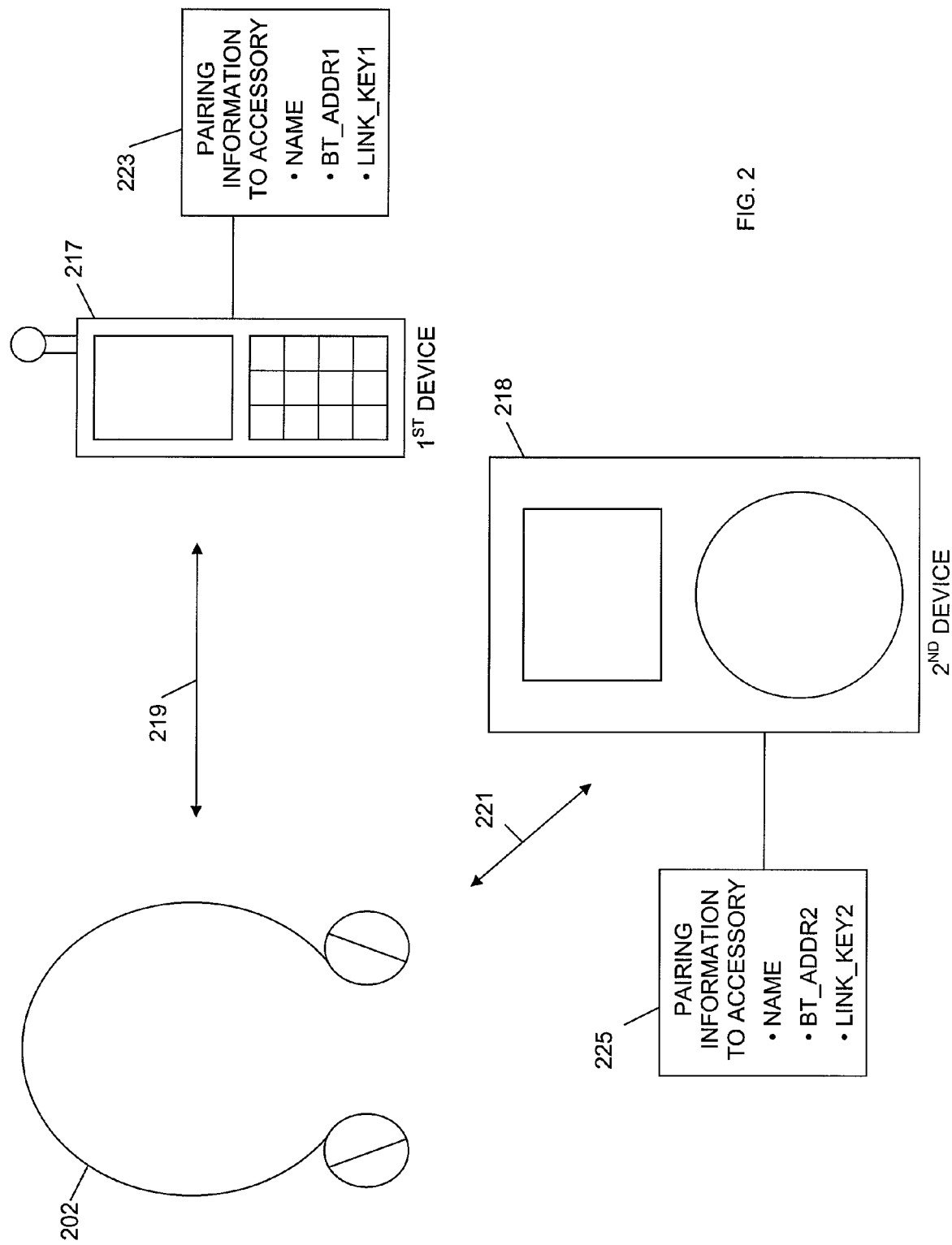
FIG. 2 shows an embodiment of an accessory Bluetooth-enabled device with Bluetooth connection to two other Bluetooth devices.

FIG. 2 shows according to an embodiment of a headset as an exemplary use of the accessory device of FIG. 1. The accessory device 202 can be in simultaneous communication via Bluetooth transports 219, 221 to a first device 217 and a second device 218. As discussed above, the accessory device 202 is first connected 219 to the first device 217 for example a cell phone, according to a first profile that may be a hands free profile. The accessory device 202 is second connected 221 to the second device 218 for example an MP3 player, according to a second profile that may be an advanced audio distribution profile. Each of the first device 217 and the second device 218 contains pairing information 223, 225 that may be sent to the accessory device 202. The first device 217 may contain 223 for example, a friendly name of the first device, the Bluetooth address of the first device, and a link key that may be used for more secure communication between the first device and the accessory device 202. Similarly, the second device 218 may contain 225 for example, a friendly name of the second device, the Bluetooth address of the second device, and a link key that may be used for more secure communication between the second device and the accessory device. The names and Bluetooth addresses are passed to the accessory device by each of the first device and the second device. In a similar manner, the accessory device contains a friendly name of the accessory device and a Bluetooth address, that are passed to the first device 217 and the second device 218. Each of the first device and the second device negotiate a link key with the accessory device 202. The link keys are shared between paired devices, that is, there is a link key shared between the first device and the accessory device, and a distinct link key shared between the second device and the accessory device. In this manner the devices may be paired for connection as shown 219, 221.

Figure 3:
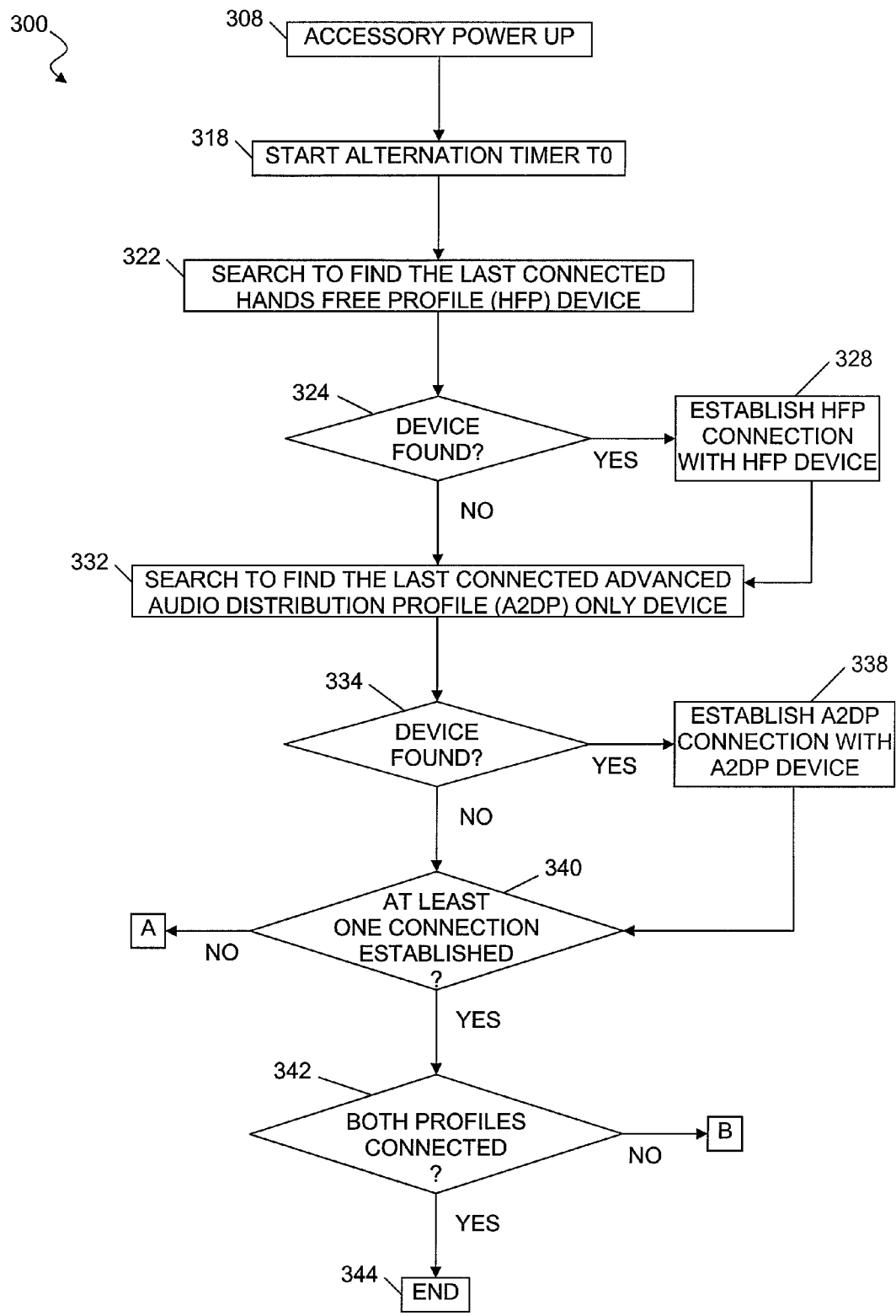
FIG. 3 shows a flow chart of an embodiment of a method 300 of automatically pairing an accessory Bluetooth device to multiple devices based on their profile, priority, and last-connected status, and describes a portion of the described method in which a search is made for a last-connected HFP device and for a last-connected stand-alone A2DP device.

FIG. 3 shows a flow chart of an embodiment of a method 300 of automatically pairing an accessory Bluetooth device to multiple devices based on their profile, priority, and last-connected status. As discussed above, automatic pairing of an accessory Bluetooth device may provide a more user-friendly solution to the problem of pairing multiple devices to a Bluetooth accessory, thus sparing a user the cumbersome steps needed to accomplish pairing manually.

Figure 4:
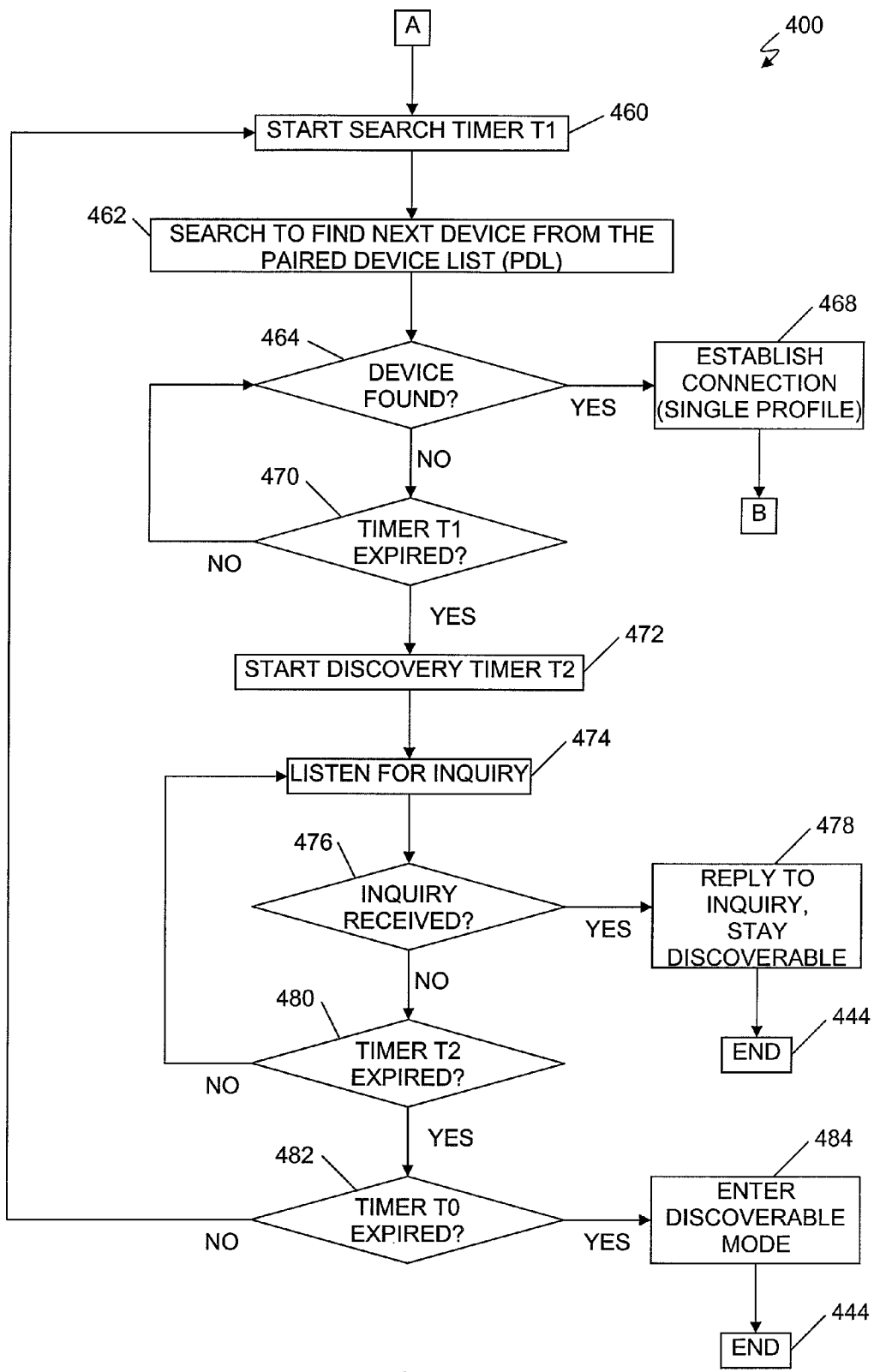
FIG. 4 describes a portion of the described method where neither the last-connected HFP device nor the last-connected stand-alone A2DP device was found and a search is made for other devices listed in the Paired Device List (PDL), and is a continuation of the flow chart of FIG. 3.
Figure 5:
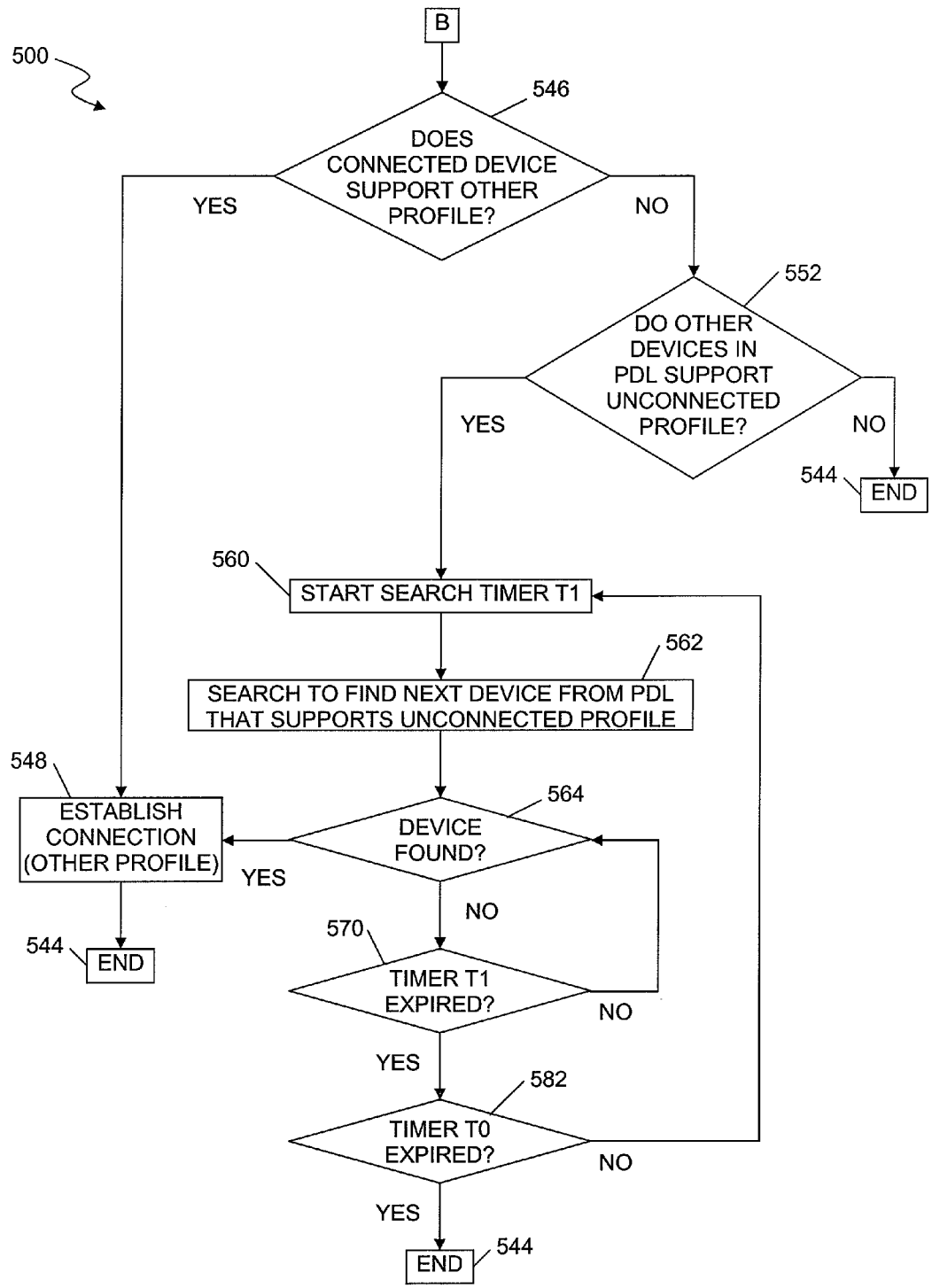
FIG. 5 shows a portion of the described method in which connection to one device has been made according to one profile, and the method attempts to establish a connection to the same or another device according to another profile, and is a continuation of the flow charts of FIG. 3 and FIG. 4.

The flow chart of the embodiment of the method 300 is continued at A to FIG. 4, and at B to FIG. 5. FIG. 3 describes a portion of the method in which a search is made for a last-connected HFP device and for a last-connected stand-alone A2DP device. FIG. 4 describes a portion of the method where neither the last-connected HFP device nor the last-connected stand-alone A2DP device was found and a search is made for other devices listed in the PDL. FIG. 5 describes a portion of the method in which connection to one device has been made according to one profile, and the method attempts to establish a connection to the same or another device according to another profile.

In the described embodiment, the flow chart commences with power up of the accessory device 308. As mentioned, at power up, if the paired device list (PDL) of the accessory is empty, the accessory enters discoverable mode, and remains discoverable until paired with another device or powered off. The paired device list may be empty because for example, the accessory device may be newly purchased, and/or it may be the first use of the device. The paired device list may be empty due to a hardware or software reset that cleared the contents of the PDL. As mentioned above, in discoverable mode a Bluetooth device will listen for inquiries from other Bluetooth devices and will respond to an inquiry. The device's response to the inquiry indicates that it is available for pairing and connection with another Bluetooth device.

If the PDL is not empty, that is, if the accessory Bluetooth device has been previously paired with other devices such as a mobile communication device 117 (see FIG. 1) as shown in the PDL 114, then upon power up, an alternation timer T0 is started 318. As explained below, the accessory device will alternate between searching for previously paired devices, and entering discoverable mode, until either the accessory device connects with another Bluetooth device, or the alternation timer T0 expires.

As previously discussed, it may be advantageous to search for previously paired devices with particular profiles in a predetermined order. When a cellular phone, for example, supports both HFP and A2DP, automatic connecting according to HFP may be desirable before connecting according to A2DP, since a user's use of their mobile communication device may be considered more crucial than use of a media player. As mentioned above, were the connecting according to A2DP to occur first, the Bluetooth accessory would be precluded from subsequent automatic connecting with a stand-alone Bluetooth media player, for example, an MP3 player. A predetermined order for searching may eliminate this difficulty.

The described method 300 for automatic connecting of devices in the PDL runs until the expiration time $t_0$ of the alternation timer T0 is reached. It is understood that the expiration time $t_0$ is a time value that may be predetermined for consistency with Bluetooth standards and protocols. It may range, for example, between approximately 300 seconds and approximately 600 seconds. In an embodiment the expiration time $t_0$ may be determined according to the number of devices listed in the paired device list.

A user of a Bluetooth accessory device may choose to use the accessory device primarily to provide audio input and output to a mobile communication device such as a cellular telephone. As discussed above, the device first searches for a last connected HFP device before searching for an A2DP device such as an MP3 player or other Bluetooth-enabled audio playback device that supports A2DP. A user may wish to use the accessory for listening to music when not engaged in a voice call. Thus, it may be advantageous to search for an A2DP device after having searched for an HFP device.

The accessory device may determine the last connected HFP device in accordance with HFP determining module 120 (see FIG. 1), and then may search to find that device 322 in accordance with HFP transmitting module 122. The search is made by paging the last connected HFP device and waiting for a response to the page inquiry to determine if the last connected HFP device has been found 324. The attempt to establish a connection with the HFP device is carried out in accordance with HFP signaling module 126. If a response to the page inquiry is received within a predetermined page response time, the HFP device has been found and the accessory may proceed to establish an HFP connection with the HFP device 328 in accordance with HFP connection module 128. If no response to the page inquiry is received, the HFP device has not been found. The HFP device may not be found, for example, because the mobile communication device may not have been turned on.

Whether the HFP device has been found or not, the accessory device may determine the last connected A2DP stand-alone device in accordance with A2DP determining module 130 (see FIG. 1), and then may search to find that device 332 in accordance with A2DP transmitting module 132. The search is made by paging the last connected A2DP only device and waiting for a response to the page inquiry to determine if the last connected A2DP only device has been found 334. The attempt to establish a connection with the A2DP device is carried out in accordance with A2DP signaling module 136. If the A2DP device has been found, the accessory may proceed to establish an A2DP connection with the stand-alone A2DP device 338 in accordance with A2DP connection module 138. Whether the A2DP device has been found or not, a determination is made 340 as to whether at least one connection has been established. If no connection has been established 340, the method may proceed at A to the continuation 400 (see FIG. 4). If at least one connection has been established 340, it may be the case that connections have been successfully made according to both profiles, HFP and A2DP. A determination is therefore made 342 as to whether both profiles, HFP and A2DP, are connected in the accessory Bluetooth device. If only a single connection, having one profile, has been made 342, the method may proceed at B to the continuation 500 (see FIG. 5). Otherwise, the method has established two connections with different profiles and may thus end 344.

In the foregoing discussion, a hands free profile (HFP) and an advanced audio distribution profile (A2DP) were discussed in connection with automatic pairing of multiple Bluetooth devices with an accessory Bluetooth device. In an embodiment that need not be specific to HFP and A2DP, the method may include a step of determining a last-connected listed Bluetooth-enabled device of a first profile type, if there is more than one listed Bluetooth-enabled device having a first profile in the paired device list, and may also include a step of searching to find the last-connected listed Bluetooth-enabled device having a first profile. Some Bluetooth profiles of a Bluetooth-enabled device have been discussed above in connection with the paired device list of FIG. 1. The described method may in addition include a step of determining a last-connected listed Bluetooth-enabled device of a second profile type, if there is more than one listed Bluetooth-enabled device having a second profile in the paired device, and may further include a step of searching to find the last-connected listed Bluetooth-enabled device having a second profile. It is understood that the first profile may be an HFP profile and the second profile may be an A2DP profile. It is further understood that the first profile and the second profile may be Bluetooth profiles other than HFP and A2DP profiles.

Continuing now with discussion of the described method, FIG. 4 shows a continuation 400 of the flow chart from the entry point A of FIG. 3. FIG. 4 describes a portion of the described method where neither the last-connected HFP device nor the last-connected stand-alone A2DP device was found and a search is made for other devices listed in the PDL. That is, the method 300 (see FIG. 3) proceeds to the continuation 400 if no Bluetooth connection has been established since last power up, after searching for the last-connected HFP device and the last-connected stand-alone A2DP device.

In the embodiment discussed, the steps 460 to 484 describe a process of searching for all listed Bluetooth-enabled devices of at least one of the first profile type and the second profile type in the paired device list based on a recency of connection if the last-connected listed Bluetooth-enabled device of that profile type is not found, and placing the accessory Bluetooth device in discoverable mode if no connection is made with listed Bluetooth-enabled devices in the paired device list. Thus, FIG. 4 describes alternating between search mode and discoverable mode in the case where neither the last-connected HFP device, nor the last-connected stand-along A2DP device has been found.

A search timer T1 is started 460 to govern how long searching for a device from the PDL may take place. The search timer T1 may have an expiration time $t_1$. It is understood that the expiration time $t_1$ is a time value that may be predetermined for consistency with Bluetooth standards and protocols. It may range, for example, between approximately 2 seconds and approximately 10 seconds.

In the search phase, the accessory device may determine the next device from the PDL in accordance with HFP determining module 120 (see FIG. 1), A2DP determining module 130, or a determining module for another profile. The device may search to find that device 462 in accordance with HFP transmitting module 122, A2DP transmitting module 132, or a transmitting module for another profile. As discussed above, the search is made by paging the next device, that is, sending out a page inquiry that includes the Bluetooth address of the next device, and waiting for a response to the page inquiry to determine if the device has been found 464. The attempt to establish a connection may be made in accordance with HFP signaling module 126, A2DP signaling module 136, or a signaling module for another profile. If a response to the page inquiry 464 is received within a predetermined page response time, here denoted $t_1$, the device has been found and the accessory may proceed to establish a connection with the device 468. The connection may be established in accordance with HFP connection module 128, A2DP connection module 138, or a connection module for another profile. The connection made is a single profile connection. After establishing the connection 468, the method proceeds at B to the continuation 500 (see FIG. 5).

If no response to the page inquiry is received 464, the device has not been found. If the expiration time $t_1$ of the search timer T1 has not been reached 470, waiting for a response to the page inquiry may continue 464. Otherwise, the method may continue 470 with the accessory entering discoverable mode and starting 472 a discovery timer T2. The discovery timer T2 governs the time that the accessory remains in discoverable mode. In discoverable mode, the accessory listens for any Bluetooth inquiries sent out by other Bluetooth devices that may be received by its Bluetooth transceiver 106 (see FIG. 1). If a Bluetooth inquiry has been received 476, another Bluetooth device has paged the accessory device. The accessory may make a reply to the Bluetooth inquiry and remain discoverable 478. In this case the accessory may become connected to the device to whose page it responded, but may also remain available for other connections. The method may end at this point 444.

If no Bluetooth inquiry from another Bluetooth device has been received 476, a determination may be made 480 as to whether the discovery timer T2 has expired. If the discovery timer T2 has not expired, the accessory continues to listen for any inquiries 474. If the discovery timer T2 has expired, a determination may be made 482 as to whether the alternation timer T0 has expired. If the alternation timer T0 has expired, the accessory device enters discoverable mode 484 and remains there. The method may end at this point 444. If the alternation timer has not expired, the method may continue again with restarting 460 the search timer T1 to govern how long searching for the next device from the PDL may take place.

FIG. 5 describes a portion of the method in which connection to one device has been made according to one profile, and the method attempts to establish a connection to the same or another device according to another profile, and is a continuation 500 of the flow charts of FIG. 3 and FIG. 4. As discussed above, the method enters the continuation 500 from the entry point B of FIG. 3 if a single profile connection, either an HFP or a stand-alone A2DP connection, has been made by the accessory Bluetooth device with one of the last connected HFP or stand-alone A2DP devices. The method enters the continuation 500 from FIG. 4 if a single profile connection has been made by the accessory device with any other device on the paired device list besides the last connected HFP and stand-alone A2DP devices. As just mentioned, neither the last connected HFP device nor the last connected A2DP only device is connected with the accessory device when the method enters the continuation 400 of FIG. 4 from FIG. 3. Thus, at the entry point B to the continuation 500, the accessory device is connected with a single Bluetooth device according to a single profile. The profile may be HFP, A2DP, or another profile.

Many Bluetooth devices support more than one Bluetooth profile. It may be preferable to make a second Bluetooth connection with the already connected device, if that device supports a second Bluetooth profile. Thus, the continuation 500 proceeds with a determination 546 as to whether the connected single Bluetooth device supports another profile besides the profile according to which the connected single Bluetooth device is connected to the accessory device 102 (see FIG. 1). If the already connected single Bluetooth device does support another profile besides the profile according to which it is connected to the accessory, the accessory device establishes a second connection with the Bluetooth device, the second connection according to the other profile 548. At this juncture the accessory device has two Bluetooth connections to the same device, each connection according to a different profile. The method may end 544.

If the already connected single Bluetooth device does not support another profile besides the profile according to which it is connected to the accessory device, a determination may be made as to whether there are other devices listed in the PDL that support a profile other than the profile already connected 552. If there are no other devices supporting a different profile, the method may end 544. If there are other devices supporting a different profile, a search timer T1 is started 560 to govern how long searching for a device from the PDL may take place. The search timer T1 may have an expiration time $t_1$, as discussed above, ranging between approximately 2 seconds and approximately 10 seconds.

In the search phase, the accessory device may determine the next device from the PDL according to a determining module such as, for example HFP determining module 120 (see FIG. 1), A2DP determining module 130, or a determining module for another profile. The accessory device may then search to find that device 562 in accordance with a transmitting module such as HFP transmitting module 122, A2DP transmitting module 132, or a transmitting module for another profile. As discussed above, the search is made by paging the next device from the PDL and waiting for a response to the page inquiry to determine if the device has been found 564. If a response to the page inquiry is received within a predetermined page response time $t_1$, the device has been found and the accessory may proceed to establish a connection with the device according to the other profile 548. After establishing the connection 548, the method may end 544.

If no response to the page inquiry associated with search 562 is received, the device has not been found. If the search timer T1 has not expired 570, waiting for a response to the page inquiry may continue 564. Otherwise, a determination may be made as to whether the alternation timer T0 has expired 582. If the alternation timer T0 has not expired, method may continue again with restarting 560 the search timer T1 to govern how long searching for the next device from the PDL may take place. If the alternation timer T0 has expired, the method may end 544. In this manner the described method provides for automatic pairing and connection of an accessory Bluetooth device to multiple Bluetooth devices.

Before a Bluetooth accessory can stream speech, music, or other content to and from a device, it must be paired with the device, exchanging identification and authentication data. The pairing process can be cumbersome if multiple devices must be paired with a single Bluetooth accessory. The described methods and devices provide a more user-friendly solution to the problem of pairing multiple devices to a Bluetooth accessory. The paired device list of the Bluetooth accessory is checked to determine the most recently paired devices having particular Bluetooth profiles, for example, a hands free profile (HFP) or an advanced audio distribution profile (A2DP). The accessory attempts connection with the devices, if found. Otherwise the accessory continues connection attempts with devices on the paired device list, according to the connection recency, until the accessory has two connections with different profiles. If no connections are made, or the paired device list is empty, the device enters discoverable mode. In this manner a more user-friendly solution to the problem of pairing a Bluetooth accessory to multiple Bluetooth devices is provided.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method in an accessory Bluetooth-enabled device having a memory configured to store a paired device list of listed Bluetooth-enabled devices, the method comprising:
powering up the accessory Bluetooth device;
determining whether there is more than one listed Bluetooth enabled device having a first profile in the paired device list;
determining a last-connected listed Bluetooth-enabled device of the first profile type if there is more than one listed Bluetooth-enabled device having the first profile in the paired device list;
searching to find the last-connected listed Bluetooth-enabled device having the first profile;
attempting to establish a connection between the accessory Bluetooth-enabled device and the last-connected listed Bluetooth-enabled device of the first profile type if the last-connected listed Bluetooth-enabled device of the first profile type is found;
determining whether there is more than one listed Bluetooth enabled devices having a second profile in the paired device list;
determining a last-connected listed Bluetooth-enabled device of the second profile type if there is more than one listed Bluetooth-enabled device having the second profile in the paired device;
searching to find the last-connected listed Bluetooth-enabled device having the second profile;
attempting to establish a connection between the accessory Bluetooth-enabled device and the last-connected listed Bluetooth-enabled device of the second profile type if the last-connected listed Bluetooth-enabled device of the second profile type is found;
searching for next-to-the-last connected listed Bluetooth-enabled device of at least one of the first profile type and the second profile type in the paired device list based on a recency of connection if the last-connected listed Bluetooth-enabled device of that profile type is not found; and
placing the accessory Bluetooth device in discoverable mode if no connection is made with listed Bluetooth-enabled devices in the paired device list;
wherein the accessory-enabled device is automatically paired to a multiple number of Bluetooth-enabled devices having at least the first profile type and the second profile type after powering up.

2. A method in a Bluetooth-enabled device having a memory configured to store a paired device list configured to include a plurality of paired devices, the method comprising:
powering up the Bluetooth device;
determining whether there is more than one listed Bluetooth enabled devices having a hands free profile (HFP) in the paired device list;
determining a last-connected HFP device if there are more than one HFP devices in the paired device list;
searching to find the last-connected HFP device;
attempting to establish a connection between the Bluetooth device and the last-connected HFP device if the last-connected HFP device is found;
determining whether there is more than one listed Bluetooth enabled device having a stand-alone advanced audio distribution profile (A2DP) in the paired device list;
determining a last-connected stand-alone A2DP device in the paired device;
searching to find the last-connected stand-alone A2DP device;
attempting to establish an A2DP connection between the Bluetooth device and the connected HFP device if the connected HFP device supports A2DP;
searching for next-to-the-last connected HFP and A2DP devices in the paired device list based on a recency of connection with other HFP and A2DP devices in the paired device list if the last-connected HFP device and the last-connected A2DP device are not found; and
placing the Bluetooth device in discoverable mode if no connection is made with any other HFP or A2DP devices in the paired device list;
wherein the Bluetooth device is automatically paired to and establishes a connection with the HFP device if found and the A2DP device if found, after powering up.

3. The method of claim 2 further comprising:
establishing a connection between the Bluetooth device and the last-connected HFP device.

4. The method of claim 2 further comprising:
establishing a connection between the Bluetooth device and at least one of the last-connected HFP device and another HFP device that is in the paired device list.

5. The method of claim 4 further comprising:
attempting to establish an A2DP connection between the Bluetooth device and the connected HFP device if the connected HFP device supports A2DP as a second profile and if there is no connection made to a stand-alone A2DP device.

6. The method of claim 2 further comprising:
attempting to establish a connection between the Bluetooth device and the last-connected stand-alone A2DP device if the last-connected stand-alone A2DP device is found.

7. The method of claim 6 further comprising:
establishing a connection between the Bluetooth device and the last-connected stand-alone A2DP device.

8. The method of claim 2 further comprising:
attempting to establish an HFP connection between the Bluetooth device and the next-to-the-last connected HFP device if the last-connected HFP device is not found.

9. A Bluetooth-enabled device, comprising:
a power source;
a controller coupled to the power source;
an interface for the power source, configured to activate the power source and coupled to the controller;
a Bluetooth transceiver coupled to the controller;
a memory configured to store a paired device list configured to include a plurality of paired devices;
a plurality of modules stored in memory in communication with the controller;
an HFP determining module configured to determine whether there is more than one listed Bluetooth enabled device having a hands free profile (HFP) in the paired device list and further configured, upon activation of the power source, to determine a last-connected HFP device if there are more than one HFP devices in the paired device list;
  an HFP transmitting module configured to generate a command so that the Bluetooth transceiver transmits a signal configured to search to find the last-connected HFP device;
  an HFP signaling module configured to attempt to establish a connection between the Bluetooth device and the last-connected HFP device if the last-connected HFP device is found;
  an A2DP determining module configured to determine whether there is more than one listed Bluetooth enabled device having a stand-alone advanced audio distribution profile (A2DP) in the paired device list and further configured to determine a last-connected stand-alone A2DP device in the paired device;
  an A2DP transmitting module configured to generate a command so that the Bluetooth transceiver transmits a signal configured to search to find the last-connected A2DP device; and
  an A2DP signaling module configured to attempt to establish a connection between the Bluetooth device and the last-connected stand-alone A2DP device if the last-connected stand-alone A2DP device is found,
wherein the HFP signaling module and the A2DP transmitting module are configured to search for next-to-the-last connected HFP and A2DP devices in the paired device list based on a recency of connection with other HFP and A2DP devices in the paired device list if the last-connected HFP device and the last-connected A2DP device are not found and place the Bluetooth device in discoverable mode if no connection is made with any other HFP or A2DP devices in the paired device list.

10. The device of claim 9 further comprising:
an HFP connection module configured to establish a connection between the Bluetooth device and at least one of the last-connected HFP device and another HFP device that is in the paired device list.

11. The device of claim 9 wherein A2DP signaling module configured to attempt to establish an A2DP connection between the Bluetooth device and the connected HFP device if the connected HFP device supports A2DP as a second profile and if there is no connection made to a stand-alone A2DP device.

12. The device of claim 9 further comprising:
an A2DP connection module configured to establish a connection between the Bluetooth device and the last-connected stand-alone A2DP device.

13. The device of claim 9 wherein the device is one of a Bluetooth-enabled headset, a Bluetooth-enabled car kit, a Bluetooth-enabled adapter configured for portable devices, home entertainment devices, or personal computers, and a Bluetooth-enabled computer speaker system.

* * * * *